J. CAIRNS.
VEHICLE TIRE.
APPLICATION FILED FEB. 2, 1914.
1,165,845.
Patented Dec. 28, 1915.
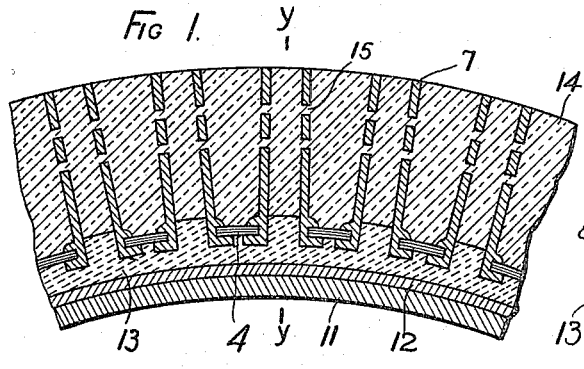
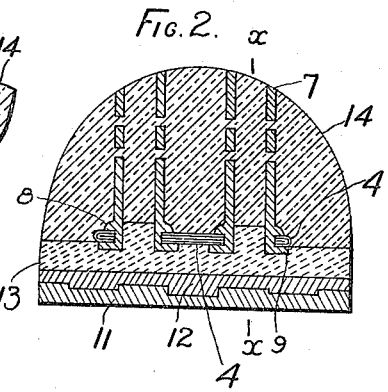
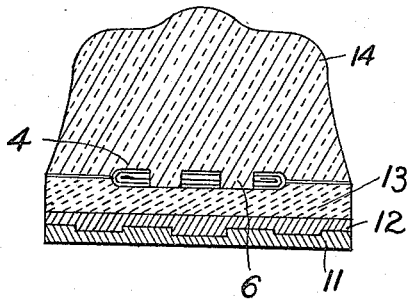
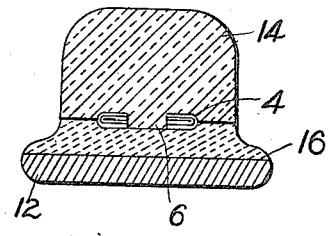
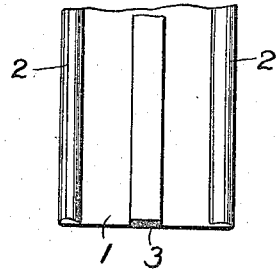
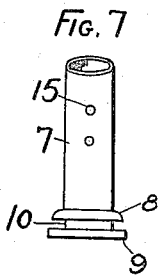
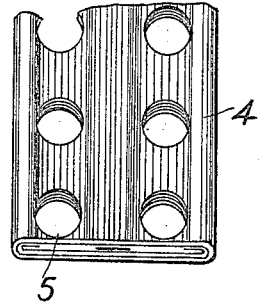
Witnesses.
George T. Millard.
George Hughes.
Inventor.
John Cairns
COLUMBIA PLANOGRAPH CO., WASHINGTON, D. C.

UNITED STATES PATENT OFFICE.

JOHN CAIRNS, OF HOVE, BRIGHTON, ENGLAND.

VEHICLE-TIRE.

1,165,845.

Specification of Letters Patent.

Patented Dec. 28, 1915.

Application filed February 2, 1914. Serial No. 816,069.

*To all whom it may concern:*

Be it known that I, JOHN CAIRNS, a subject of the King of Great Britain, residing at 27 Payne avenue, Hove, Brighton, England, have invented certain new and useful Improvements in Vehicle-Tires, of which the following is a specification.

The object of my invention has been to provide a new improved resilient or super-resilient tire for vehicle wheels which shall have among others any or all of the following advantages:

The main object of my invention is to provide a cushion tire having equally as much resiliency as the ordinary pneumatic tire now in use, the resilient effect being accomplished by the employment of hard rubber as a base, and soft rubber above the hard rubber and the relatively hard rubber as a tread, with an interposed fabric belt having suitable perforations to receive rubber or metallic means for holding the layers of rubber in an assembled position on the rim of the wheel to which this tire is applied.

In the accompanying drawings I have illustrated the invention by the form best known to me but such form is to be regarded as typical of many possible forms and my invention is not to be confined thereto.

In the accompanying drawings, Figure 1 is a longitudinal section on line *x*. *x*. of Fig. 2 showing a layer of soft pure rubber and a special perforated fabric belt with rubber pillars inserted in the perforations. Fig. 2 is a cross section on line *y*. *y*. of Fig. 1 showing a double row of ferrules. Fig. 3 is a cross section of a modified form of pillar tire showing double rows of pillars and Fig. 4 is a cross section of beaded edge tire showing a single row of pillars. Fig. 5 is a fragmentary view showing the central foundation ply of the belt overlapped at each side and a strengthening piece running up the center ready for the fabric to be laterally coiled around. Fig. 6 is a view of one form of the special fabric belt with openings ready to receive the pillars or ferrules. Fig. 7 is a view of one form of ferrule separately.

In the construction illustrated I have provided a tire which may be of any suitable figure in cross section and which is resilient and preferably made of rubber. The tire is made up of different kinds of material, hard rubber and very soft pure Pará rubber being inlaid near the base with a suitable tread rubber, and means to hold the different kinds of rubber in position and prevent them from breaking away while running. And means are also preferably used for the purpose of holding the pillars or ferrules in the tire. Such means in the present instance consists of an annular folded perforated fabric belt embedded within the tire near the base.

The foundation fabric ply 1, Fig. 5 has inturned edges 2 forming a bead which is stitched or otherwise fastened down and may be centrally provided with a strengthening piece 3. Extending around this foundation ply 1 is a fabric belt 4 consisting of one or more layers of material which are stitched or fastened together in any suitable way, a number of openings 5 being cut or pierced through the said belt to enable rubber pillars 6 or ferrules 7, to be passed therethrough. These openings 5 may be arranged in any number of rows around the belt, so that with a single row of openings 5 the foundation ply of fabric 1 is inturned at its opposite sides to form beaded edges 2, but with a double or treble row of openings 5 the foundation ply in addition is provided with one or more layers or a strengthening piece 3 is placed around the center between the openings 5. The belt 4 is continuous, the meeting edges being obliquely-directed circumferentially to form a joint which is solutioned, stitched or suitably fastened, thus making it the same thickness and strength throughout. The belt 4 may be made continuous without any joints if required.

As shown in Figs. 1 and 2 the ferrules 7 of metal or other suitable material are perforated and may be internally and externally tapered and have toward the inner end a pair of flanges 8 and 9 between which is a reduced neck 10. The ferrules 7 are inserted in the coiled belt 4 by pressing the same therethrough until the said belt engages between the flanges 8 and 9 and the openings 5 embrace the reduced neck 10.

With a suitable number of these ferrules 7 arranged around the belt 4 the device consists of a metal band 11, a hard rubber layer 12, a very soft rubber layer 13 and a tread rubber layer 14 which passes through the perforations 15 in the ferrule 7, the whole being vulcanized together so that the belt 4 is within a short distance of the base of the tire while the ferrule 7 runs up from the belt 4 to the tread of the tire. The outer flange 8 prevents the ferrules being forced out of the belt when weight is brought on that part of the tire while the inner flange 9 prevents the ferrules being displaced from causes such as skidding or slipping.

The projections of the soft rubber or like material occupying the center of the ferrules 7 serve as supports therefor and thus prevent the ferrules at all times and under all strain from moving relatively to the foundation underneath the belt 4, while the perforations 15 in the said ferrules with the rubber or like material running therethrough will prevent the ferrules breaking away from position.

As shown in Figs. 3 and 4, the tread rubber 14 is caused to pass through the openings 5 in the belt 4 to the soft rubber layer 13 located underneath the said belt forming a rubber pillar 6. The ferrules 7 are thereby dispensed with.

What I do claim as my invention and desire to secure by Letters Patent, is:—

In a resilient tire, a base, a layer of soft rubber supported on the base, a layer of hard rubber supported above the soft rubber, a belt comprising a substantially wide fabric folded upon itself to provide double layers, said belt having apertures, tubular members, each tubular member having a groove adapted to engage the walls of the openings of the fabric, said tubular members having openings in the walls thereof to admit molten rubber to the interior thereof during the molding process of the tire, whereby a portion of the soft rubber may find its way to the interior thereof, and said tubular member being constructed to allow molten rubber to extend into the tubular member, through the bottom whereby the tubular member is connected to the layer of hard rubber.

In testimony whereof, I affix my signature in the presence of two witnesses.

JOHN CAIRNS.

Witnesses:
ARTHUR J. PACK,
WILLIAM H. LOCHYER.

Copies of this patent may be obtained for five cents each, by addressing the "Commissioner of Patents, Washington, D. C."